US00RE40702E

(19) United States
(12) Reissued Patent
Pizano et al.

(10) Patent Number: US RE40,702 E
(45) Date of Reissued Patent: Apr. 21, 2009

(54) METHOD FOR SECURING VIDEO IMAGES

(75) Inventors: Carlos Pizano, Mountain View, CA (US); Gregory Heileman, Albuquerque, NM (US)

(73) Assignee: Visual Advances LLC, Las Vegas, NV (US)

(21) Appl. No.: 11/418,555

(22) Filed: May 4, 2006

Related U.S. Patent Documents

Reissue of:
(64) Patent No.: 6,731,756
Issued: May 4, 2004
Appl. No.: 09/337,718
Filed: Jun. 21, 1999

(51) Int. Cl.
*H04N 7/167* (2006.01)
*H04N 7/16* (2006.01)

(52) U.S. Cl. ..... 380/201; 380/202; 713/189; 713/193

(58) Field of Classification Search ..... None
See application file for complete search history.

(56) References Cited

U.S. PATENT DOCUMENTS

| | | | |
|---|---|---|---|
| 5,471,675 | A | 11/1995 | Zias |
| 5,881,287 | A | 3/1999 | Mast |
| 5,930,515 | A | 7/1999 | Ducharme et al. |
| 6,098,171 | A | 8/2000 | Johnson et al. |
| 6,195,474 | B1 | 2/2001 | Snyder et al. |
| 6,516,416 | B2 | 2/2003 | Gregg et al. |

OTHER PUBLICATIONS

Adam Perer: "What is DirectX? The DirectX Experience", article[online], [retrieved on Oct. 10, 2002]. Retrieved from the internet<URLhttp://www.geocities.com/SiliconValley/Way/3390/whatisdirectx.html>dated 1998.

Amir Herzberg: "Safeguarding Digital Library Contents" IBM Haifa Research Laboratory Tel Aviv, Israel D–Lib Magazine Jan. 1998.

H. Snyder/David P. Maher: "Music on the Internet & the Intellectual Property Protection Problem" Jack Lacy/James Published in Proc. ISIE, Guimares, Portugal Jul. 1997.

Matt Blaze/Joan Feigenbaum/Jack Lacy: "Decentralized Trust Management" Published in Proc. IEEE conf. on security & privacy Oakland, CA May 1996.

Artistscope: "Artistscope" Problem areas http:/www.artistscope.com/_info/problemareas.htm; Copyright Artistscope strategies 1998–99.

*Primary Examiner*—Benjamin E. Lanier

(57) ABSTRACT

A method for protecting the video memory on a computer system from being illicitly copied. The invention decrypts a previously encrypted image and displays it on the video screen. During the time the image is displayed, the invention protects it from being copied by other running applications. This is accomplished in multithreaded operating systems by first issuing a multithreaded locking primitive to the video memory resource, and then inserting a pending video hardware request that will take precedence over any subsequent video memory access requests. The pending request serves the purpose of destroying the contents of video memory. The pending request is passive in that it does not execute unless a malicious program has removed the video memory lock.

29 Claims, 3 Drawing Sheets

METHOD FOR SECURING VIDEO IMAGES

Matter enclosed in heavy brackets [ ] appears in the original patent but forms no part of this reissue specification; matter printed in italics indicates the additions made by reissue.

BACKGROUND OF THE INVENTION

1. Field of the Invention (Technical Field)

The present invention relates to the field of displaying digital images on a computer, and in particular to the protection of these images from unauthorized copying.

2. Background Art

One of the fundamental problems associated with making multimedia content (e.g., digital images, digital video, and digital audio) publicly available over the global internet is the inability of stopping anyone who accesses the content from copying it, and subsequently distributing it to others. For example, using the Microsoft Internet Explorer® or the Netscape Navigator® browsers, a user can press the right mouse button while a multimedia object in the browser is selected, and they are then given the option of saving this object. Furthermore, in the case of the digital images, the Microsoft Windows® 95, 98, or NT operating systems generally allow a user to perform a "screen capture", saving a copy of whatever is displayed on the screen. In these operating systems, this is accomplished by pressing the "Print Screen" button on the computer keyboard, thereby saving a bit-mapped image of the computer screen in a "clipboard". The clipboard can then be "passed" into image processing applications that can manipulate the bit-mapped image, allowing one to save selected regions of the bit-map. In addition, there are a number of software applications that provide more sophisticated image capture capabilities, including "HyperSnap-Dx", G. Koshaniak, and "Capture Professional". Recently, a number of products related to the idea of a "secure container" have been proposed, including DigiBox™ by InterTrust Technologies Corporation, "The DigiBox: A Self-Protecting Container for Electronic Commerce", O. Sibert, Dbernstein, and D. Van Wie, USENIX 1995 Electronic Commerce Workshop, and Cryptolopes® by the IBM Corporation, "Cryptolope Containers". The generic idea involves encapsulating encrypted digital content, along with a set of rules for decrypting the content, within the secure container. Users are only allowed to decrypt specific pieces of the content, as specified by the rules, once they have obtained authority for doing so. Typically, access to the encrypted content is controlled via a "key exchange" over a separate channel to each user (e.g., Cryptolope® uses RSA public key encryption). If the proper authority is granted to a user, then that user is able to use their specific key to "unlock" portions of the content, thereby obtaining a "clear view" of the content. This same concept can be extended to groups of users.

With respect to images, secure containers prevent a protected image from being viewed until a user is given the proper authority. Once the image is viewable; however, secure containers do not specifically prevent the image from being copied using screen capture programs. To address this problem, a number of "countermeasures" have been employed by content providers in order to discourage illicit copying of images once they are in "clear view". These include placing visible watermarks in an image, or only making a "low resolution" version of the image available for viewing. However, each of these approaches is lacking in one way or another. For example, visible watermarks are in general easily removed using simple image processing operations, and in both of the cases cited above, the prospective buyer does not get to view the image they may wish to buy. Ideally, a consumer should be able to view the actual content they are contemplating purchasing, but they should not be able to download this content unless the owner of the content has granted permission to do so.

An example of the present methodology for securing video images is in U.S. Pat. No. 5,881,287 to Mast, entitled Method and Apparatus for Copy Protection of Images in a Computer System. However, as can be seen, there are several deficiencies in the Mast patent. The embodiment in Mast discloses a library, plus a set of installed services to be used by other applications. The present invention is an application. The copy protection is provided to the image files, not as a run-time service to other applications. Additionally, The present invention does not require the presence or installation of services or other applications other than provided by the operating system-level components.

In the Mast patent, the sole mode of copy protection once the image has been decrypted, requires the use of windows hooks as means to protect the images in disk and video memory. The present invention does not rely or require any kind of hook mechanism. Hook global mechanisms are not favored in environments where process security is important. The present invention uses direct manipulation of video memory that will bypass hook mechanisms. Mast requires that the applications that use the protection provided by said invention, be modified to link and make calls into the protection DLL (BITBLOCK.DLL). In addition, the protection DLL must make the calls to the protected applications. The present invention does not require other programs to be modified to accommodate the means of protection. In addition, the present invention does not rely on calls to other applications to provide the means of protection. The means of protection relies solely on calls to operating system-level services.

Mast also requires the protection DLL (BITBLOCK.DLL) to install a callback function into the Microsoft Windows 3.1® BitBlt() GDI function hook chain. The present invention does not make use of protection DLLs, nor does it use callback functions to provide means of protection. The Mast invention requires a device driver and a means for intercepting memory read requests. The present invention does not rely or require device drivers or other standalone decryption services, although it can be implemented using them. Decryption is provided as a routine embedded in the application.

The general goal of the present invention is to allow multimedia content providers to make their intellectual property (i.e., their images) publicly available, while at the same time preventing those who view these images from copying them. Specifically, during the time an image is viewable, the present invention prevents the image from being copied or screen captured. Thus, if users attempt to view the image from "outside" the secure viewer, they will only see the noise-like encrypted content. Under specific conditions, the secure viewer will allow a user to copy an image, but only if the user possesses a secret key necessary to decrypt the image. This gives content owners the ability to control who is able to save their images. Note that this approach is quite different from the manner in which secure containers are used. In particular, under a specific viewing mode (and assuming the image is encrypted for this mode) a user can always view the image; however, they are never able to copy it. This security is accomplished in the secure viewer by directly controlling the client system output devices.

Specifically, the present invention details how operating system services or custom device drivers can be used to gain direct control of video hardware. In its present embodiment in the Microsoft Windows® 95/98/NT platforms, it uses the services of DirectX® to directly manipulate and control the video hardware. Other embodiments are possible, as described below.

SUMMARY OF THE INVENTION (DISCLOSURE OF THE INVENTION)

In accordance with the present invention, there is provided a method of securing video images in computer systems. The invention provides a method of allowing copies of images to be made only with authorization. The preferred method of preventing illicit copying of a displayed image from a computer video memory comprises the steps of decoding a proprietary image format into video memory, controlling video hardware and locking video memory and displaying the image. The preferred step of decoding a proprietary image format into video memory comprises decrypting a previously encrypted image using a secret key. The preferred step of controlling video hardware and locking video memory comprises the substeps of obtaining exclusive cooperative control of the video hardware, allocating video memory, locking video hardware and issuing pending video hardware operations, and destroying an image displayed in video memory via pending video hardware operations if an attempt is made to unlock video memory. The preferred substep of obtaining exclusive cooperative control of the video hardware comprises issuing video hardware control DirectX® calls. An alternative substep of obtaining exclusive cooperative control of the video hardware comprises a first set of calls to a video device driver. The preferred substep of allocating video memory comprises creating at least one display surface. The preferred substep of locking video hardware and issuing pending video hardware operations comprises issuing video hardware locking and issuing pending hardware operation DirectX® calls. The alternative substep of locking video hardware and issuing pending video hardware operations comprises a second set of calls to a video device driver. The preferred substep of destroying the image via pending video hardware operations if an attempt is made to unlock video memory comprises execution of pending video hardware operations. The preferred step of displaying the image comprises the steps of decoding a native image file format, verifying an image file using a check sum method, if the image file is valid, reading decrypting information from the image file and decrypting the image into video memory.

The preferred method of preventing illicit copying of images from a computer video memory comprises the steps of decoding a proprietary image format into video memory, controlling video hardware and locking video memory comprising the substeps of executing the following DirectX® calls:

```
LPDIRECTDRAW DirectXhandle1, DirectXhandle2;
DirectDrawCreate(VideoID, &DirectXhandle, 0);
DirectXhandle1→Queryinterface(IID_IDirectDraw2,
  (void**)DirectXhandle2);
DirectXhandle2→SetCooperativeLevel(WindowHandle,
  DDSCL_EXCLUSIVE|DDSCL_FULLSCREEN);
```

obtaining exclusive cooperative control of the video hardware, allocating video memory comprising the substeps of executing the following DirectX® calls:

```
LPDIRECTDRAWSURFACE primary_surface, back_
  surface, blank_surface;
DDSURFACEDESC surface_descriptor;
DDSCAPS surface_capabilities;
surface_descriptor.ddsCaps.dwCaps=DDSCAPS_
  PRIMARYSURFACE|
DDSCAPS_FLIP|DDSCAPS_COMPLEX;
surface_descriptor.dwBackbufferCount=1;
DirectXhandle2→CreateSurface(&surface_descriptor,
  &primary_surface, 0);
primary_surface→GetAftachedSurface(&surface_
  capabilities, &back_surface);
```

locking video hardware and issuing pending video hardware operations comprising the substeps of executing the following DirectX® call:

```
primary_surface→Lock(0, &surface_descriptor,
  DDLOCK_WAIT|
DDLOCK_WRITEONLY, 0)
```

destroying an image via pending video hardware operations if an attempt is made to unlock video memory comprising the substeps of issuing the following DirectX® calls:

```
primary_surface→Flip(0, DDFLIP_WAIT);
back_surface→BItFast(0, 0, blank_surface, 0,
  DDBLTFAST_WAIT).
```

The preferred method further comprises the step of creating a blank surface. The preferred step of creating a blank surface comprises executing the following DirectX® calls:

```
LPDIRECTDRAWSURFACE blank_surface;
DDSURFACEDESC surface_descriptor;
surface_descriptor.ddsCaps.dwCaps=DDSCAPS_
  PRIMARYSURFACE;
DirectXhandle2→CreateSurface(&surface_
  descriptor, ␣_surface, 0);
```

A primary objective of the present invention is to allow multimedia content providers to make images publicly available, while at the same time preventing those who view these images from copying them without authority.

Another object of the present invention is to allow multimedia content providers to make selected images available to designated user groups. In this case, images will be encrypted according to a key associated with the user group, and therefore only members of the user group will be able to view the selected images. A second key can be provided to the user for the purpose of downloading (i.e., copying) the image if the content provider wishes to do so.

A primary advantage of the present invention is that it allows content providers to explicitly control not only who is able to view their images, but more importantly, who is able to copy them.

Another advantage of the present invention is that it can be used to make potentially offensive images "non-viewable" to certain users. For example, the required viewing key can be supplied to a user once he has indicated that he would like to view the material, the content provider has verified some claim (e.g., proof of age), etc. Such protocols are easily incorporated into the present invention. In addition, the present invention can be used to protect the confidentially of sensitive or personal information, such as medical x-rays, or classified images.

Yet another advantage is that the invention can allow the viewing of images to be time-locked, allowing the image to be viewed for a prescribed period of time.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
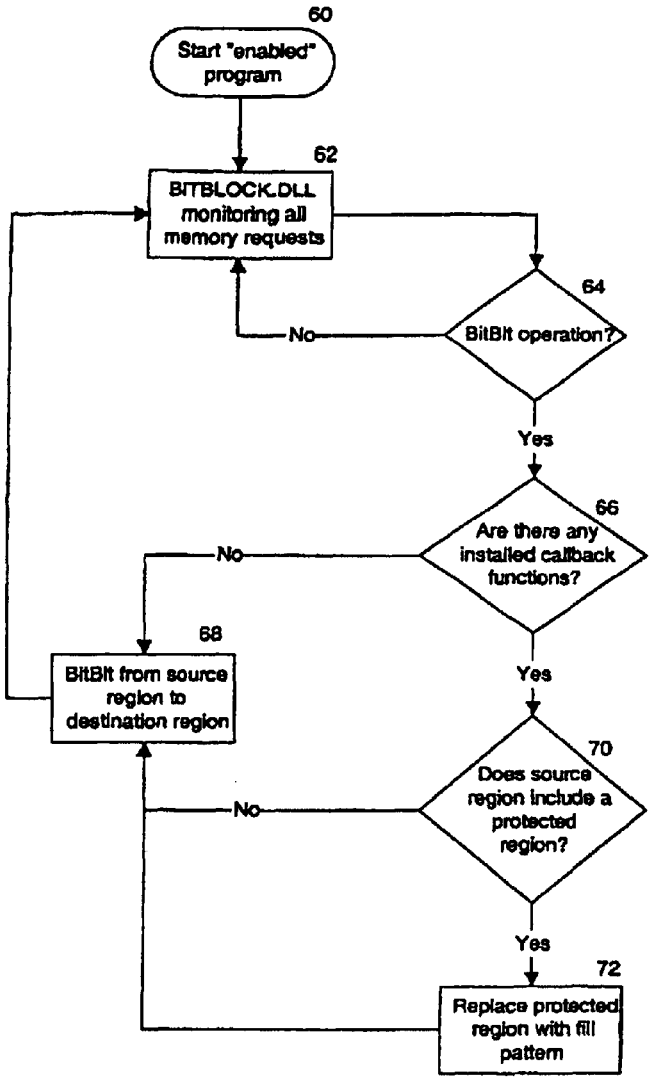
FIG. 1 is a flowchart describing a prior art image protection system.

DESCRIPTION OF THE PREFERRED EMBODIMENTS (BEST MODES FOR CARRYING OUT THE INVENTION)

The basic capabilities offered by the secure viewer are that (1) viewing of an image can be restricted to specific users, (2) it is screen capture resistant, and (3) users are only allowed to save an image after they have ben given explicit permission to do so.

All modern computer operating systems are memory protected, and offer true multitasking capabilities (e.g., Microsoft Windows® 95/98/NT or any of the modern UNIX® derivative). In these operating systems, computing resources such as printers, serial ports, and the video screen are administered so as to ensure "fair" access by all user-level applications. In the particular case of Windows® 95/98/NT, normal programs output data to the screen using an operating system-level service called the Graphics Device Interface (GUI); direct access to the video memory by user-level applications is not allowed. Any application that tries to access memory outside of its own Windows® assigned memory region is terminated immediately by Windows®. Therefore, every single pixel rendered on the screen must result from commands issued to the GDI through an object called the Device Context (DC). Using the DC, an application is able to issue draw commands, text commands, bitmap commands, along with many other display-related functions. There are several types of DCs. Normal applications use a DC that is restricted to their own window area, but nothing prevents an application from asking for a special type of DC that encompasses the whole screen. For example, the following C function call, which can conceivably be executed by any application, requests a display screen handler from the GDI:

```
hdcScreen=CreateDC("DISPLAY", NULL, NULL, NULL);
```

If the GDI returns a valid handler (which will be stored in the variable hdcScreen in this example), the application is able to copy the entire screen contents using the appropriate code. The relevant C code fragment for accomplishing this is:

```
hdcCompatible=CreateCompatibleDC(hdcScreen);
BitBlt (hdcCompatible, 0,0, MaxX, MaxY, hdcScreen, 0,0, SRCCOPY));
```

Specifically, this code will copy the entire screen contents (i.e., video memory) into an application-owned memory region pointed to by the variable hdcCompatible. Once this is accomplished, the application can proceed to save to disk the memory region containing the screen contents as a bitmap or in any other image file format.

There are two known ways to protect the contents of the video memory from being "screen captured" by an application program.

The first is to monitor all running applications, intercepting any read requests that attempt to access video memory (as is disclosed in Mast, U.S. Pat. No. 5,881,287). This is a cumbersome solution to the problem. For example, Mast involves intercepting all memory transfers, an then evaluating if the requesting application has the right to access the memory. This will adversely affect the running time of any program, and would significantly slow down a data intensive program (even if it does not access video memory). A second approach is the present invention.

A flowchart describing the '287 patent is shown in FIG. 1. Start "enabled"program 60 indicates that all application programs wishing to protect the contents of video memory must be enabled. That is, the program must be instrumented with code that enables it to call the BITBLOCK dynamic link library. The application programs must provide a callback function, and register it with the BITBLOCK dynamic link library. The regions of memory that an application program wishes to protect are specified in this callback function. The BITBLOCK dynamic link library monitors all memory requests 62, checking to determine whether any of them are BITBLT operations 64 attempting to access video memory. If a BITBLT operation 64 is detected, the BITBLOCK dynamic link library checks to see it has any registered callback functions 66. If there are no registered callback functions, the video memory transfer is allowed to perform a BITBLT from source region to destination region 68; otherwise, the BITBLOCK dynamic link library calls all callback functions to determine the protected regions 70 in video memory. If the required video memory access falls in the protected region 70, the BITBLOCK replaces the destination memory with a fill pattern 72.

Specific differences between the present invention and U.S. Pat. No. 5,881,287 (Mast) are given below.

1) In the '287 patent, the preferred embodiment is a library and a set of installed services (a service is a running application in the same machine that provides some functionality) to be used by the image applications.
   a) In the present invention, the preferred embodiment is an application. The copy protection is provided to the image files via encryption, and to video memory using pending video hardware operations via direct hardware control. The Mast patent provides protection to video memory as a run-time service to other applications.
   b) The present invention does not require the presence or installation of services or other applications other than those provided by the operating system itself. (DirectX® is part of the operating system).
2) In the '287 patent, the sole mode of copy protection (besides encryption) requires the use of Windows 3.1® hooks as a means to protect the images in disk and video memory.
   a) The present invention does not rely or require any kind of hook mechanism. Hook global mechanisms are not favored in environments where process security is important. A global hook as required in the Mast patent needs to inspect memory transactions that do not belong to the application. This will allow a given application to snoop into data associated with other applications, thereby compromising system security as a whole.

b) The present invention uses direct manipulation of video memory that will bypass hook mechanisms. The idea behind DirectX® is accelerated graphics by allowing the application "direct" interaction with the hardware.

3) The '287 patent requires that the applications that use the protection provided by said invention must be modified to link and make calls into the protection DLL (BITBLOCKDLL). In addition, the protection of DLL must make calls to the protected applications.

a) Present invention does not require other programs to be modified to accommodate the means of protection.

b) Present invention does not rely on calls to other applications to provide the means of protection. The means for protection relies solely on calls to operating system-level services.

4) The '287 patent requires the protection dynamic link library (BITBLOCKDLL) that installs a callback function into the Windows 3.1® BitBlt() GDI function hook chain. This implementation is not allowed in true multi-user computing environments (e.g., Windows NT®) as it would allow users to "snoop" in other users' applications.

a) The present invention does not make use of protection dynamic link libraries.

b) The present invention does not use callback functions to provide a means of protection.

5) The '287 patent provides a similar mechanism for protecting files that requires a decrypting device driver and means for intercepting file reads. The present invention does not rely or require virtual device drivers or other standalone decryption services. Decryption is provided as a routine embedded in the application.

The present embodiment of the invention takes advantage of the DirectX® extensions to get full and exclusive control of the video memory. Measures are taken by the invention to display images, and at the same time block any other application from performing a screen capture. The specific details of how this is accomplished are described below, but first a discussion is required on definitional terminology related to DirectX®:

Surface: A rectangular portion of memory, usually containing image data. The memory used to represent a surface can exist either in display RAM or in system RAM.

Flippable surface: These are surfaces that allow page flipping, a technique where the contents of an entire surface are made visible instantaneously through a hardware operation. A flippable surface is actually two surfaces, one that is visible and once that is not. The non-visible surface is called back buffer. When a page flip occurs, the surface that was previously a back buffer becomes visible, and the surface that was previously visible becomes the back buffer.

Primary Surface: The portion of video RAM that is visible on the screen. Primary surfaces must reside on video RAM Primary surfaces are usually flippable surfaces.

Lock: A lock exists when a program is granted unrestricted direct access to a primary surface as if it were a local memory block. During a lock, no other program or even the operating system can access the locked surface.

Page Flip: The action of swapping the primary and the back buffer surfaces. This is accomplished using video hardware and is therefore very fast. Only surfaces that are not locked can be swapped.

Cooperative Level: Generic term for the level of control that the application has over the video or display hardware. Exclusive cooperative level means that the application has full control of the display hardware, and can change display modes as well as the system-wide palette.

Figure 2:
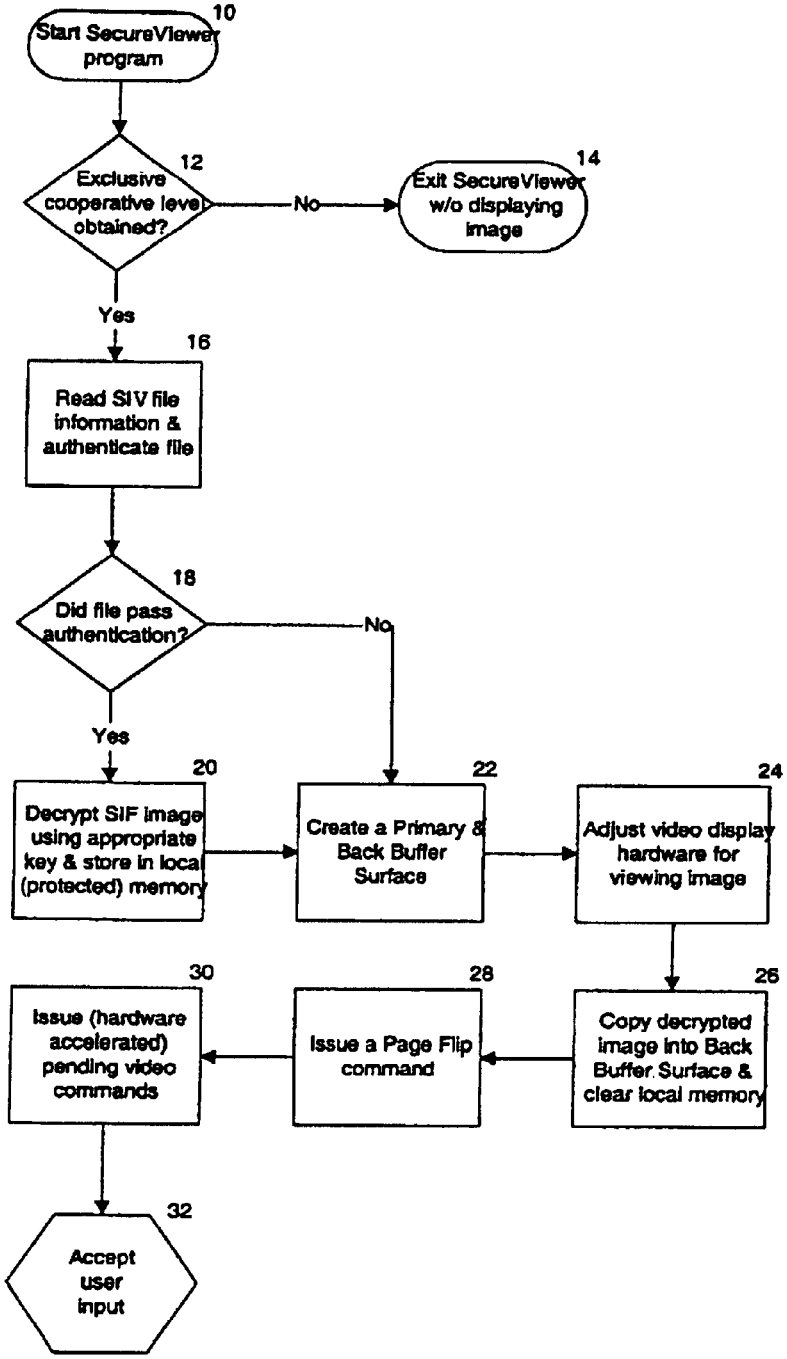
FIG. 2 is a flowchart describing the processes used to display an image.

The flowchart shown in FIG. 2 describes the processes used by the secure viewer in order to display an image. First, the secure viewer program 10 is executed. A secure image viewable (SIV) image is selected for viewing. At least some portion of a SIV image is encrypted, and all information necessary to decrypt the image (except the secret key) is encoded in the SIV image. In addition, all SIV images contain authentication information that is used to determine if an image has been modified since its creation. The secure viewer application first requests exclusive cooperative control of the video hardware 12. Specifically, the program determines whether or not it can take control of the video hardware. If this cannot be obtained, the secure viewer application terminates, without displaying the image 14. If; however, exclusive cooperative control can be obtained, then the program attempts to read the appropriate information from the SIV image 16 necessary to decrypt it. This step includes the authentication information. If the decrypting information can be obtained from the image, and the SIV file passes the authentication 18, then the file is decrypted 20; otherwise, it is not (this allows non-SIV images to be viewed using the secure viewer) and commands are issued to create primary and back buffer surfaces 22 in the video card memory, and video display hardware is adjusted for viewing 24. Next, the image is copied into the back buffer surface, and the local memory copy of the image is destroyed 26. After this a page flip command is issued to the video hardware 28, which moves the image to the primary surface and makes the image viewable on the display device. A command is issued to lock the primary surface, along with an additional command that access the video hardware 30 (more than one command can be issued). Since the primary surface is locked, the command will not be immediately executed, but will remain pending in a queue. The choice of the command is very important. In the present embodiment, the BLTFAST command is used, which acts to clear the video memory containing the image. This command is hardware accelerated, so that the clearing of video memory occurs very fast, in particular, faster than any software program that might try to capture the encrypted image (the specific sequence of steps are described in FIG. 3). Finally, user input is accepted 32. The details of this step are expanded in FIG. 3.

Figure 3:
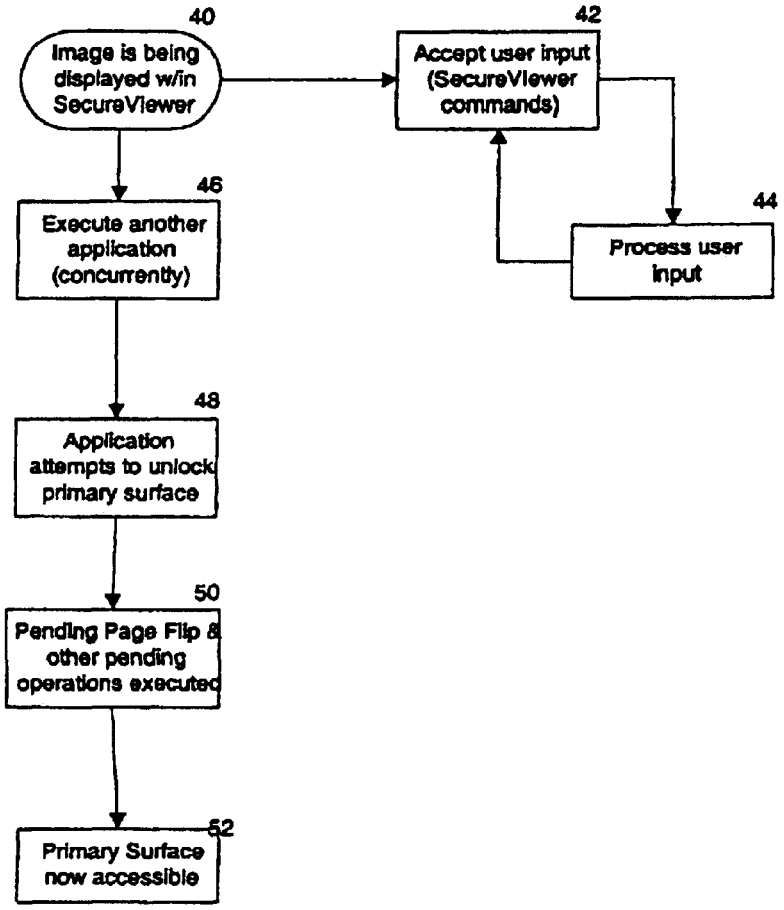
FIG. 3 is a flowchart depicting how the invention prevents image capture.

In FIG. 3, the specific steps used by the secure viewers in order to provide security to an image as it is being displayed are shown. Initially, an image is displayed using the secure viewer 40. The user is able to interact with the secure viewer program via a user interface 42, the program will then process the input 44 that allows the user to perform various functions such as changing the image resolution, reading information about the author of the image, saving the image (if they possess the correct key), etc. Note that other applications may be executed 46 concurrently while the secure viewer is displaying an image (these programs, as well as the secure viewer, are managed by the operating system). The secure viewer does not interfere with these other applications, unless they attempt to unlock the primary surface 48. If an application does unlock the primary surface 48, the pending page flip command is executed followed by the BLTFAST command, clearing the contents of video memory 50. During these operations, all other access to video memory is preempted. Only after the pending commands are executed will the primary surface be made available to the requesting application 52.

The present invention involves securing a queued (or suspended) video hardware operation into a list of pending video operations. This is done in such a way that when another running program tries to read the video memory, the queued operation executes and destroys the information contained in the video memory, thereby stopping the application from coping the displayed image. Notice that a program running concurrently with the present invention is not affected unless it tries to access video memory. In this sense, the present invention is "passive", unlike the prior art.

In addition to the possibility of screen captures by application-level programs, one has to be concerned with screen capture via operating system-level mechanisms. Specifically, Windows® 95,98, and NT all provide the ability to perform screen capture by simply pressing the "Print Screen" key. In this case, the operating system itself captures the screen and conveniently places it in the clipboard where the user may access and copy it.

The present invention can effectively protect from both operating system-level and application-level screen captures by means of queuing operations to the video card. If the operating system allows direct access to video memory, the preferred embodiment is a user-level program. If it does not, the preferred embodiment is by a combination of a kernel-mode device driver and a user level program. The present embodiment uses Microsoft DirectX® to obtain user-level direct video memory access. Thus, it does not require the use of a device driver other than the standard ones available in Windows® 95/98/NT operating environments.

In the preferred embodiment, exclusive control of video hardware is obtained by executing the following DirectX® calls using Windows® 95/98/NT (or any system supporting DirectX®):

1. LPDIRECTDRAW DirectXhandle1, DirectXhandle2;
2. DirectDrawCreate(VideoID, &DirectXhandle, 0);
3. DirectXhandle1→Queryinterface(IID_IDirectDraw2, (void)DirectXhandle2**);
4. DirectXhandle2→SetCooperativeLevel (WindowHandle, DDSCL_EXCLUSIVE|DDSCL_FULLSCREEN);

Line 1 declares two pointer variables to the DirectDraw (a subsystem of DirectX®) interface called DirectXhandle1 and DirectXhandle2. In line 2, the DirectXhandle1 pointer is initialized with respect to a specific video driver (VideoID in this case). If a DirectXhandle1 is a valid pointer, then the call to the Queryinterface function in line 3 will initialize the pointer DirectXhandle2 to the address of the DirectDraw2 interface. Next, in line 4, exclusive control of the video hardware is requested, along with full screen viewing. If another application currently has exclusive control of the video hardware, this call will fail. If for this reason, or any other reason, the SetCooperativeLevel call fails to obtain exclusive control of the hardware, the secure viewer application will terminate without displaying the said image.

In the preferred embodiment, video memory is allocated by executing the following DirectX® calls:

1. LPDIRECTDRAWSURFACE primary_surface, back_surface, blank_surface;
2. DDSURFACEDESC surface_descriptor;
3. DDSCAPSsurface_capabilities;
4. surface_descriptor.ddsCaps=DDSCAPS_PRIMARYSURFACE|DDSCAPS_FLIP|DDSCAPS_COM
5. surface.dwBackBufferCount=1;
6. DirectXhandle2→CreateSurface(&surface_descriptor, &primary_surface, 0);
7. primary_surface→GetAttachedSurface(&surface_capabilities, &back_surface);

In lines 1–3, DirectX® specific pointers variables are declared. In line 4, a specific type of surface is specified. The flag DDSCAPS_PRIMARYSURFACE indicates that the created surface will be displayed, the flag DDSCAPS_FLIP indicates that this surface may be flipped, and the flag DDSCAPS_COMPLEX indicates that one or more back surfaces can be attached to the primary surface. In line 5 a request for one back surface is specified. In line 6, surfaces are created according to the specifications given in lines 4 and 5. Finally in line 7, the primary surface is used to obtain a pointer to the back surface.

In the preferred embodiment, an image is displayed by performing the following steps:

1. Depending the native image file format.
2. Verifying the integrity of the image file using a check sum method.
3. If the file is valid, reading information stored in the image file that is necessary to decrypt the image (assuming the secret key has been supplied).
4. Decrypting of the said image into video memory.

In the preferred embodiment, video hardware is locked by executing the following DirectX® call:

primary_surface→Lock(0, &surface_descriptor, DDLOCK_WAIT|DDLOCK_WRITEONLY, 0);

This call will lock the primary surface preventing any other running thread from accessing this surface until a command is issued to unlock the surface.

In the preferred embodiment, pending video hardware operations are issued using the following DirectX® calls:

1. primary_surface→Flip(0, DDFLIP_WAIT);
2. back_surface→BItFast(0, 0, blank_surface, 0, DDBLAST_WAIT);

Where the first pending request in line 1 will move the contents of the primary surface, which is currently being displayed, to the back surface, and the second pending operation in line 2 will overwrite, the contents of the back surface, effectively destroying the previously displayed image. The DDFLIP_WAIT and DDBLTFAST_WAIT parameters will cause the operations to remain pending in the queue. The blank_surface variable in line 2 points to a blank surface containing all zeros (black) or an alternative image. This surface is created in a manner similar to the way that the primary and back surfaces when created. Note that these operations will not be executed until the primary surface is unlocked (e.g., by a screen capture program).

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosure of all references, applications, patents, and publications cited above are hereby incorporated by reference.

What is claimed is:

1. A method of preventing copying of [a displayed] *an* image from a computer video memory comprising the steps of:

[a. decoding an] *storing the* image [into] *in* the video memory;

[b. controlling video hardware and protecting the video memory, wherein the protecting step comprises] locking the video memory [and]*;* issuing [at least one pending operation comprising] a suspended video operation in a queue [for destroying], *wherein the suspended video operation is executable to destroy* the contents of the video memory;

[c. displaying the image;] and

[d.] destroying the image displayed in the video memory via said at least one pending operation if an attempt is made to unlock the video memory.

2. The method of claim 1 wherein the step of [decoding an] *storing the* image [into] *in* the video memory comprises decrypting a previously encrypted image using a secret key.

3. The method of claim 1 further comprising the step of obtaining exclusive cooperative control of the video hardware comprising issuing video hardware control DirectX calls.

4. The method of claim 1 further comprising the step of obtaining exclusive cooperative control of the video hardware comprising a first set of calls to a video device driver.

5. The method of claim 1 further comprising the step of allocating video memory comprising creating at least one display surface.

6. The method of claim 1 wherein the [step] *steps* of locking the video memory and issuing at least one pending hardware operation [comprises] *comprise* issuing video hardware locking and issuing pending operations using DirectX® calls.

7. The method of claim 1 wherein the [step] *steps* of locking the video memory and issuing at least one pending operation [comprises] *comprise* issuing a second set of calls to a video device driver.

8. The method of claim 1 wherein the step of destroying the image displayed in the video memory comprises destroying the image displayed in the video memory when another application unlocks the video memory for reading the video memory.

9. The method of claim 1 [whereby] *further comprising* the step of displaying the image [comprises] *comprising* the steps of:

a. decoding a native image file format;

b. verifying an image file using a check sum method;

c. if the image file is valid, reading decrypting information from the image file; and d. decrypting the image into video memory.

10. A method of preventing copying of images from a computer video memory, the method comprising the steps of:

a) decoding a proprietary image format into video memory;

b) controlling video hardware and locking video memory, wherein the locking step comprises locking a video surface and issuing at least one pending operation wherein the pending operation comprises a pending video hardware operation issued via a DirectX® call, comprising the substeps of executing the following DirectX® calls;

LPDIRECTDRAW DirectXhandle1, DirectXhandle2;

DirectDrawCreate(VideoID, &DirectXhandle, 0);

DirectXhandle1→QueryInterface(IID_IDirectDraw2, (void)Directxhandle2**);

DirectXhandle2→SetCooperativeLevel (WindowHandle, DDSCL_EXCLUSIVE|DDSCL_FULLSCREEN);

c) obtaining exclusive cooperative control of the video hardware;

d) allocating video memory comprising the substeps of executing the following DirectX® calls:

LPDIRECTDRAWSURFACE primary_surface, back_surface, blank_surface;

DDSURFACEDESC surface_descriptor;

DDSCAPS surface_capabilities;

surface_descriptor.ddsCaps.dwCaps=DDSCAPS_PRIMARYSURFACE

DDSCAPS_FLIP IDDSCAPS_COMPLEX;

surface_descriptor.dwBackBufferCount=1;

DirectXhandle2→CreateSurface(&surface_descriptor, &primary_surface, 0);

primary_surface→GetAttachedSurface(&surface_capabilities, &back_surface);

e) locking video hardware comprising the substeps of executing the following DirectX® call;

primary_surface→Lock(0, &surface_descriptor, DDLOCK_WAIT|DDLOCK_WRITEONLY, 0)

f) destroying an image via pending video operations if an attempt is made to unlock video memory comprising the substeps of issuing the following DirectX® calls:

primary_surface→Flip(0, DDFLIP_WAIT);

back_surface→BItFast(0, 0, blank_surface, 0, DDBLTFAST_WAIT).

11. The method of claim 10 further comprising the step of creating a blank surface.

12. The method of claim 11 wherein the step of creating a blank surface comprises executing the following DirectX® calls:

LPDIRECTDRAWSURFACE blank_surface;

DDSURFACEDESC surface_descriptor;

surface_descriptor.ddsCaps.dwCaps=DDSCAPS_PRIMARYSURFACE;

DirectXhandle2→CreateSurface(&surface_descriptor, ␣_surface, 0).

13. The method of claim 1 [wherein the step of controlling video hardware and protecting the video memory comprises] *further comprising the step of executing* a hardware accelerated Bit-Blt (bit-boundary block transfer) instruction.

*14. A method for preventing copying of an image from a computer video memory of a computer running a multithreaded operating system, said method comprising:*

*issuing a multithreaded locking primitive associated with the computer video memory;*

*issuing a passive video hardware operation executable upon said multithreaded locking primitive being removed;*

*displaying the image; and*

*executing said passive video hardware operation in response to said multithreaded locking primitive being removed, wherein said executing said passive video hardware operation destroys the displayed image.*

*15. The method of claim 14 further comprising:*

*generating the image by decrypting an encrypted image; and*

*storing the image in the computer video memory.*

*16. The method of claim 14 further comprising:*

*obtaining exclusive cooperative control of the computer video memory.*

*17. The method of claim 16 wherein obtaining exclusive cooperative control of the computer video memory comprises issuing one or more video hardware control DirectX® calls.*

*18. A system comprising:*

*a video memory configured to store an image;*

*a processor coupled to the video memory, wherein the processor is configured to execute program instructions to:*

*lock the video memory;*

*issue a suspended video operation executable to destroy the contents of the video memory; and*

*destroy the image in the video memory by executing the suspended video operation if an attempt is made to unlock the video memory.*

*19. The system of claim 18 wherein the processor is further configured to execute the program instructions to:*

*generate the image by decrypting an encrypted image; and*

*store the image in the video memory.*

*20. The system of claim 18 wherein the processor is further configured to execute the program instructions to:*

*obtain exclusive cooperative control of the video memory.*

*21. The system of claim 20 wherein in obtaining exclusive cooperative control of the video memory, the processor is further configured to execute the program instructions to issue one or more video hardware control DirextX® calls.*

*22. The system of claim 18 wherein in locking the video memory, the processor is further configured to execute the program instructions to issue a multithreaded locking primitive associated with the video memory.*

*23. The system of claim 22 wherein the attempt to unlock the video memory comprises an attempt to remove the multithreaded locking primitive.*

*24. A computer-readable storage medium comprising program instructions for preventing copying of an image from a video memory, wherein the program instructions are executable to implement:*

*storing the image in the video memory;*

*locking the video memory;*

*issuing a suspended video operation executable to destroy the contents of the video memory; and*

*destroying the image in the video memory by executing the suspended video operation if an attempt is made to unlock the video memory.*

*25. The computer-readable storage medium of claim 24 wherein the program instructions are further executable to implement:*

*generating the image by decrypting an encrypted image.*

*26. The computer-readable storage medium of claim 24 wherein the program instructions are further executable to implement:*

*obtaining exclusive cooperative control of the video memory.*

*27. The computer-readable storage medium of claim 26 wherein in obtaining exclusive cooperative control of the video memory, the program instructions are further executable to implement issuing one or more video hardware control DirectX® calls.*

*28. The computer-readable storage medium of claim 24 wherein in locking the video memory, the program instructions are further executable to implement issuing a multithreaded locking primitive associated with the video memory.*

*29. The computer-readable storage medium of claim 28 wherein the attempt to unlock the video memory comprises an attempt to remove the multithreaded locking primitive.*

* * * * *